US005717211A

United States Patent [19]
Katsevich

[11] Patent Number: 5,717,211
[45] Date of Patent: Feb. 10, 1998

[54] GENERALIZED LOCAL EMISSION TOMOGRAPHY

[75] Inventor: Alexander J. Katsevich, Los Alamos, N. Mex.

[73] Assignee: The Regents of the University of California, Oakland, Calif.

[21] Appl. No.: 685,903

[22] Filed: Jul. 22, 1996

[51] Int. Cl.$^6$ ............................................. G01T 1/166
[52] U.S. Cl. ........................... 250/363.04; 250/370.09
[58] Field of Search ........................ 250/363.04, 370.09

[56] References Cited

U.S. PATENT DOCUMENTS

| | | | |
|---|---|---|---|
| 4,189,775 | 2/1980 | Inouye et al. | 364/414 |
| 4,365,339 | 12/1982 | Pavkovich et al. | 378/15 |
| 4,433,380 | 2/1984 | Abele et al. | 364/414 |
| 4,446,521 | 5/1984 | Inouye | 364/414 |
| 4,670,892 | 6/1987 | Abele et al. | 378/4 |
| 5,319,551 | 6/1994 | Sekiguchi et al. | 364/413.19 |
| 5,434,416 | 7/1995 | Motomura et al. | 250/369 |
| 5,565,684 | 10/1996 | Gullberg et al. | 250/363.04 |

OTHER PUBLICATIONS

A.M. Cormack, "Representation of a Function by its Line Integrals, with Some Radiological Applications", 34 J. Appl. Phys., No. 9, pp. 2722–2727 (1963).

R. H. Huesman, "A new fast algorithm for the evaluation of regions of interest and statistical uncertainty in computed tomography", 29 Phys. Med. Biol., No. 5, pp. 543–552 (1984).

Kennan T. Smith and F. Keinert, "Mathematical foundations of computed tomography", 24 Applied Optics, No. 23, pp. 3950–3957 (1985).

Adel Faridani et al., "Local Tomography", 52 Siam J. Appl. Math, No. 2, pp. 459–484 (1982).

P. Kuchment et al., "On local tomography," II Inverse Problems, pp. 571–589 (1955).

*Primary Examiner*—David P. Porta
*Assistant Examiner*—David Vernon Bruce
*Attorney, Agent, or Firm*—Ray G. Wilson

[57] ABSTRACT

Emission tomography enables locations and values of internal isotope density distributions to be determined from radiation emitted from the whole object. In the method for locating the values of discontinuities, the intensities of radiation emitted from either the whole object or a region of the object containing the discontinuities are inputted to a local tomography function $\tilde{f}_A^{(\Phi)}$ to define the location S of the isotope density discontinuity. The asymptotic behavior of $\tilde{f}_A^{(\Phi)}$ is determined in a neighborhood of S, and the value for the discontinuity is estimated from the asymptotic behavior of $\tilde{f}_A^{(\Phi)}$ knowing pointwise values of the attenuation coefficient within the object. In the method for determining the location of the discontinuity, the intensities of radiation emitted from an object are inputted to a local tomography function $\tilde{f}_A^{(\Phi)}$ to define the location S of the density discontinuity and the location $\Gamma$ of the attenuation coefficient discontinuity. Pointwise values of the attenuation coefficient within the object need not be known in this case.

2 Claims, 3 Drawing Sheets

GENERALIZED LOCAL EMISSION TOMOGRAPHY

BACKGROUND OF THE INVENTION

This invention relates to tomographic image reconstruction, and, more particularly, tomographic image reconstruction from emission data. This invention was made with government support under Contract No. W-7405-ENG-36 awarded by the U.S. Department of Energy. The government has certain rights in the invention.

Emission tomography produces reconstruction of the distribution function f of a photon emission source (e.g., a radioactive isotope) inside an object. In emission tomography, the density function that is sought is the distribution of the radioactive isotope, and the data are the measurements of the intensity of photons emitted along straight lines originating from the object. Tomography equipment for obtaining the emission data is well known and is not discussed herein.

To recover the density function at a single point inside an object, standard algorithms (1) process all attenuation measurements, even along lines far from the desired point, and (2) assume that the attenuation coefficient acting on the emitted photons is either negligible or constant inside the object. In many applications, however, it is desirable or possible to collect only local data or it is not reasonable to make the simplifying assumptions about the attenuation coefficient.

There exist methods for inverting the emission tomographic data for the isotope distribution function, f, without making the simplifying assumptions about the attenuation coefficient. See, e.g., L. A. Kunyansky, "Generalized and attenuated Radon transforms: restorative approach to the numerical inversion," 8 Inverse Problems, pp. 809–819 (1992), and references therein. However, these methods are, for the most part, of an iterative nature and do not always guarantee convergence. In particular, the algorithm from Kunyansky, supra, cannot be used in the case of a piecewise smooth attenuation coefficient distribution, μ. In addition, these algorithms are global, i.e., for reconstruction of the density at a single point, the algorithms require the emission tomographic data for all lines within some planar cross-section containing the point.

There also exists a method called "local tomography" that allows one to find locations of density jumps inside a region of interest from local data without making simplifying assumptions about the attenuation coefficient. The only assumption is that the attenuation coefficient changes smoothly inside the object. Local tomography produces the reconstruction of the related density function, which is the result of the action of an elliptic pseudodifferential operator of order 1 on the original density function, f, and reproduces only the locations of density discontinuities within an object. See P. Kuchment et al., "On local tomography," 11 Inverse Problems, pp. 571–589 (1995).

In addition, the Kuchment analysis assumes that the attenuation coefficient varies smoothly inside the object. But this is clearly not always the case. For example, an attenuation coefficient can change sharply at the soft tissue-bone interface. Conventional local tomography is not suitable for such circumstances.

U.S. Patent Application 08/410,613, now U.S. Pat. No. 5,550,892, teaches a process for the tomographic reconstruction of the location and value of a discontinuity between a first internal density of an object and a second density of a region within the object. A beam of radiation is directed in a predetermined pattern through the region of the object containing the discontinuity and relative attenuation data of the beam is determined. Photon emission tomography, however, is considerably more complex. The strength of the radiation source is not known; indeed, the purpose of emission tomography is to determine the radiation source. Thus, only the intensity of emitted radiation can be detected and not relative attenuation data.

In emission tomography, there are two functions involved in the reconstruction process: distribution of radioactive isotopes inside an object and distribution of attenuation coefficients. The capability to consider distributed attenuation coefficients has not been available and present techniques are able to handle only a single function.

Accordingly, it is an object of the present invention to determine both the location and size of discontinuities from emission tomographic data.

It is another object of the present invention to determine the location and size of discontinuities from either complete or limited emission data that include a region containing the discontinuity, knowing the attenuation coefficient pointwise inside the object and assuming that the attenuation coefficient may change either smoothly or sharply inside the object.

It is one more object of the present invention to determine the locations of discontinuities in the density function and in the distribution of attenuation coefficient from either complete or limited emission tomographic data if the attenuation coefficient changes sharply inside the object, but its numerical values are not known.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, this invention includes:

(a) A method of determining by emission tomography the location and value of a discontinuity between a first internal isotope density of an object and a second isotope density of a region within the object if the distribution of the attenuation coefficient inside the object is known, and the attenuation coefficient changes either smoothly or sharply inside the object; and (b) A method of determining by emission tomography the location of a discontinuity between a first internal isotope density of an object and a second isotope density of a region within the object and also the location of a discontinuity between a first internal value of the attenuation coefficient and a second value of the attenuation coefficient of a region within the object if the distribution of the attenuation coefficient inside the object is not known, where the attenuation coefficient may change sharply inside the object.

Radiation emitted from either the whole object or a region of the object containing the discontinuity is detected in some predetermined pattern.

In the method for evaluating the value of the discontinuity, the intensities of radiation emitted from an object are inputted to a local tomography function $f_\Lambda^{(\Phi)}$ to define the location S of the isotope density discontinuity. The asymptotic behavior of $f_A^{(\Phi)}$ is determined in a neighborhood of S, and the value for the discontinuity is estimated from the asymptotic behavior of $f_A^{(\Phi)}$ knowing pointwise values of the attenuation coefficient within the object.

In the method for locating the discontinuity, the intensities of radiation emitted from an object are inputted to a local tomography function $f_A^{(\Phi)}$ to define the location S of the density discontinuity and the location $\Gamma$ of the attenuation coefficient discontinuity.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
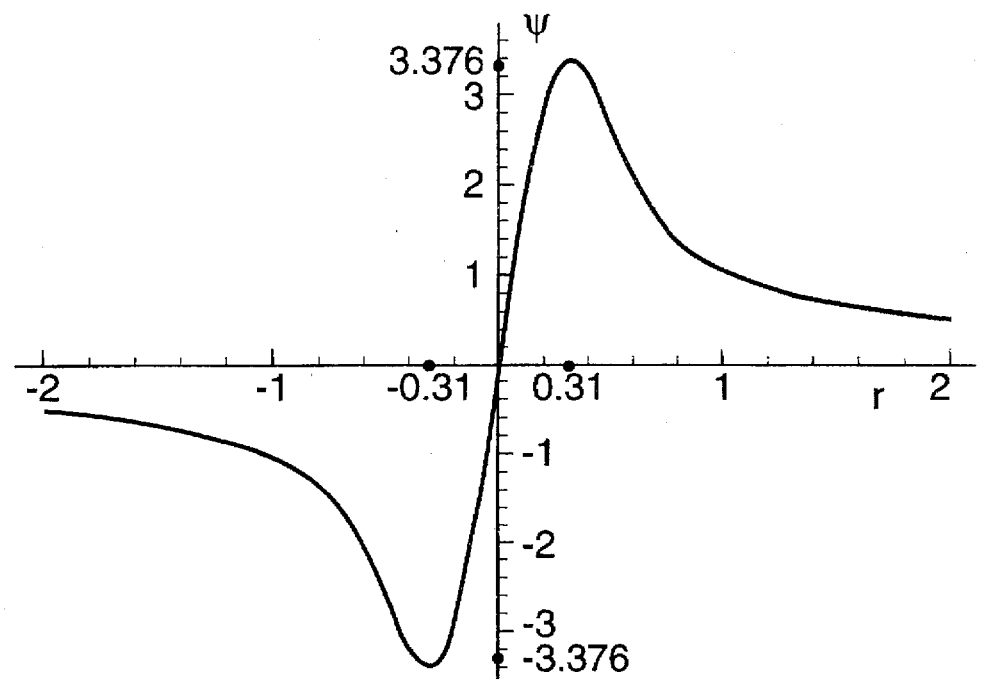
FIG. 1 graphically depicts values of an exemplary function $\psi(r)$ for use in the present invention.

The theory of Single Photon Emission Computed Tomography (SPECT) is based on the attenuated Radon transform:

$$\hat{f}^{(\Phi)}(\theta, p) = \int_{-\infty}^{\infty} f[p\Theta + t\Theta^\perp] \exp\left(-\int_t^\infty \mu(p\Theta + s\Theta^\perp)ds\right) dt, \quad \text{Eq. (1)}$$

$$\Theta = (\cos\theta, \sin\theta), \Theta^\perp = (-\sin\theta, \cos\theta).$$

Here, $\theta$ is an angle on the unit circle $S^1$, p is a location of an emission beam line, f(x) is the density of some radioactive isotope inside a patient or some object, and coefficient $\mu(x)$ characterizes attenuating properties of internal structure, e.g., body tissue. Coefficient $\mu(x)$ is assumed to be known, and f is to be determined from the measured data $\hat{f}^{(\Phi)}(\theta,p), \theta\in(0,2\pi), p\in R$. At present, there is no inversion formula that recovers f, where the data is represented by Equation (1), and $\mu(x)$ is known.

Suppose first that attenuation coefficient $\mu(x)$ is a smooth function inside the support of f. The following local tomographic function $f_A^{(\Phi)}$ for the attenuated Radon transform with smooth attenuation coefficient $\mu(x)$ is proposed in Kuchment, supra:

$$f_A^{(\Phi)}(x) = -\frac{1}{4\pi} \int_0^{2\pi} \hat{f}_{pp}^{(\Phi)}(\theta, \Theta \cdot x)d\theta, \quad \text{Eq. (2)}$$

where $\hat{f}_{pp}^{(\Phi)} = \partial^2 \hat{f}^{(\Phi)}/\partial p^2$. Denote:

$$\Phi(x,\theta) = \exp\left\{-\int_0^\infty \mu(x+t\Theta^\perp)dt\right\}. \quad \text{Eq. (3)}$$

In accordance with my invention, I have shown that $f_A^{(\Phi)}(\chi)$ satisfies $$\tilde{f}_A^{(\Phi)}(x) = \frac{1}{2\pi^2} \int_{\Re^2} \int_{\Re^2} \xi|b(y,\xi/|\xi|)f(y)e^{-i\xi\cdot(x-y)}dyd\xi, \quad \text{Eq. (4)}$$

where $$b(y,\theta) = \quad \text{Eq. (5)}$$

$$\frac{1}{2}\left[\exp\left\{-\int_0^\infty \mu(y+t\Theta^\perp)dt\right\} + \exp\left\{-\int_0^\infty \mu(y-t\Theta^\perp)dt\right\}\right].$$

This implies that the asymptotic formula for $f_A^{(\Phi)}$ in a neighborhood of $\chi_o \in S$ is as follows:

$$\tilde{f}_A^{(\Phi)}(x_o + hn(x_o)) \approx \frac{b(x_o,n(x_o))D_f(x_o)}{\pi} \frac{1}{h}, h \to 0. \quad \text{Eq. (6)}$$

Here $n(x_o)$ is a unit vector perpendicular to S at $x_o$ and $D_f(x_o)$ is the value of the jump of f at $x_o$:

$$D_f(x_o) = \lim_{h \to +0} [f(x_o + hn(x_o)) - f(x_o - hn(x_o))].$$

Numerically, instead of computing a $f_{79}^{(\Phi)}$, its mollification is computed:

$$\tilde{f}_{A\epsilon}^{(\Phi)}(x) := (W_\epsilon * \tilde{f}_A^{(\Phi)})(x) = -\frac{1}{4\pi} \int_{S^1} \int_\Re w_\epsilon''(\Theta \cdot x - p)\hat{f}^{(\Phi)}(\theta,p)dpd\theta, \quad \text{Eq. (7)}$$

where $\omega_\epsilon = RW_\epsilon$ is the classical Radon transform of $W_{\epsilon 1}$ and $W_\epsilon$ is a sequence of sufficiently smooth mollifiers with properties
(a) $W_\epsilon(\chi)$ is a radial function, $W_\epsilon(\chi):=W_\epsilon(|\chi|)$;
(b) $W_\epsilon(\chi)=0, |\chi|\geq\epsilon, W_{\epsilon(\chi)}>0, |\chi|<\epsilon$;
(c) $W_\epsilon(\chi)=\epsilon^{-2}W_1(\chi/\epsilon), \int_{|\chi|\leq 1}W_1(\chi)dx=1$; and
(d) $W_\epsilon(r)$ decreases on the interval [0,1].
A mollifier is a kernel such that its convolution with f(x) gives a sufficiently smooth function that converges to f(x) as $\epsilon \to 0$.

Combining Equations (6) and (7), the behavior of $f_{A\epsilon}^{(\Phi)}$ in a neighborhood of $\chi_o \in S$ is given by the formula $$\tilde{f}_{A\epsilon}^{(\Phi)}(x_o + \epsilon y) = \quad \text{Eq. (8)}$$

$$\frac{b(x_o,n(x_o))D_f(x_o)}{\pi} \frac{1+O(\epsilon)}{\epsilon} \psi(y \cdot n_o) + \psi_\epsilon(y \cdot n_o) + O(\epsilon\ln\epsilon),$$

where $\psi_\epsilon(r) = O(\ln\epsilon)$ is an even function of r, and $$|\nabla \tilde{f}_{A\epsilon}^{(\Phi)}(x_o)| = \frac{b(x_o,n_o(x_o))D_f(x_o)}{\pi} \frac{1+O(\epsilon)}{\epsilon^2} \psi'(0), \quad \text{Eq. (9)}$$

as $\epsilon \to 0$. In Equation 8, it is assumed that $|y|\leq c<\infty$. The function $\psi(r)$ used in Equations (8) and (9) is odd and equals:

$$\psi(r) = \int_{r-1}^{r+1} \frac{w_1(r-t)}{t} dt. \quad \text{Eq. (10)}$$

For example, in the case of the mollifier $$W_1(x) = \frac{m+1}{\pi}(1-x^2)^m, m = 8, \quad \text{Eq. (11)}$$

then $\psi'(0) = 2(m+1)$, and the corresponding graph of $\psi$ is presented in FIG. 1.

Equation (8) explicitly relates the behavior of $\tilde{f}_{A\epsilon}^{(\Phi)}$ in a neighborhood of $x_o$ with the unknown quantity $D_f(x_o)$, which is the value of the jump of f at $x_o \in S$. Since $\tilde{f}_{A\epsilon}^{(\Phi)}$ is computed by Equation (7) from the emission tomographic data and the function can be tabulated for a given sequence of mollifiers, an estimation of the original function f at $x_s$ is provided by Equation (8).

A process for evaluating $D_f(x_o)$ begins with values of the local tomography function $\tilde{f}_{A\epsilon}^{(\Phi)}$ calculated on a square grid with step size $h: x_{ij,=}(x_i^{(1)}, x_j^{(2)})=(ih,jh), i,j \epsilon z$. Choose a grid node $x_{i_o j_o}$ on S and assume that h and $\epsilon$ are sufficiently small. Then, Equation (8) becomes $$\tilde{f}_{A\epsilon}^{(\Phi)}(x) = \qquad \text{Eq. (12)}$$

$$\frac{b(x_o, n_o(x_o)) D_f(x_o)}{\pi \epsilon} \psi\left(\frac{x-x_o}{\epsilon} \cdot n_o\right) + \psi_\epsilon\left(\frac{x-x_o}{\epsilon} \cdot n_o\right),$$

$$n_o = n(x_o), x_o = x_{i_o j_o}.$$

Fix $n_1, n_2 \in N$ and consider a $(2n_1+1) \times (2n_2+1)$ window around $x_{i_o j_o}$. To use Equation (12) for finding $D_f(x_{i_o j_o})$, first estimate $n_o$ by computing partial derivatives $$N_o \approx \qquad \text{Eq. (13)}$$

$$\frac{(\tilde{f}_{A\epsilon}^{(\Phi)}(x_{i_o+1,j_o}) - \tilde{f}_{A\epsilon}^{(\Phi)}(x_{i_o-1,j_o}), \tilde{f}_{A\epsilon}^{(\Phi)}(x_{i_o,j_o+1}) - \tilde{f}_{A\epsilon}^{(\Phi)}(x_{i_o,j_o-1}))}{\sqrt{(\tilde{f}_{A\epsilon}^{(\Phi)}(x_{i_o+1,j_o}) - \tilde{f}_{A\epsilon}^{(\Phi)}(x_{i_o-1,j_o}))^2 + (\tilde{f}_{A\epsilon}^{(\Phi)}(x_{i_o,j_o+1}) - \tilde{f}_{A\epsilon}^{(\Phi)}(x_{i_o,j_o-1}))^2}}.$$

Since $\psi(r)$ is odd and $\psi_\epsilon(r)$ is even in r, $$D_f(x_{i_o j_o}) \approx \frac{\pi \epsilon}{b(x_{i_o j_o}, N_o)} \frac{\sum\limits_{\substack{|i-i_o| \leq n_1 \\ |j-j_o| \leq n_2}} \tilde{f}_{A\epsilon}^{(\Phi)}(x_{ij}) \psi\left(\frac{x_{ij}-x_{i_o j_o}}{\epsilon} \cdot N_o\right)}{\sum\limits_{\substack{|i-i_o| \leq n_1 \\ |j-j_o| \leq n_2}} \psi^2\left(\frac{x_{ij}-x_{i_o j_o}}{\epsilon} \cdot N_o\right)}. \quad \text{Eq. (14)}$$

Equations (6) and (8) imply that larger values of $\tilde{f}_{A\epsilon}^{(\Phi)}$ correspond to the side of S with larger values of f. Thus, in accordance with the present invention, the following algorithm estimates values of jumps of f from $\tilde{f}_{A\epsilon}^{(\Phi)}$:

(1) Estimate vector $N_o$ from Equation (13) and compute $b(x_{ij}, N_o)$ knowing $\mu(x)$ and using Equation (5);
(2) Compute the estimate of $D_f(x_{ij})$ from Equation (14); and
(3) The vector $N_o$ given by Equation (13) points from the smaller values of f to the larger values of f.

Suppose now that the attenuation coefficient $\mu$ is piecewise smooth. Let $\Gamma$ be a curve across which $\mu$ is not smooth, and suppose that $\mu$ is discontinuous across $\Gamma$. Another assumption is that S and $\Gamma$ do not intersect each other, except on the boundary of support of f. Equations (6) and (8) still hold in a neighborhood of almost all points on S. In a neighborhood of $\Gamma$, $$\tilde{f}_{A\epsilon}^{(\Phi)} \approx -\frac{A(x_o, \mu, f) D_\mu(x_o)}{2\pi} \frac{1}{h}, h \to 0, \quad \text{Eq. (15)}$$

where $$A(x_o, \mu, f) = \int_{-\infty}^{0} \exp\left[-\int_{t}^{\infty} \mu(x_o + sn(x_o)^{\perp}) ds\right] f(x_o + tn(x_o)^{\perp}) dt + \quad \text{Eq. (16)}$$

$$\int_{0}^{\infty} \exp\left[-\int_{-\infty}^{t} \mu(x_o + sn(x_o)^{\perp}) ds\right] f(x_o + tn(x_o)^{\perp}) dt,$$

$n(x_o)$ is a unit vector perpendicular to $\Gamma$ at $x_o$, $n(x_o)^{\perp}$ is a unit vector perpendicular to $n(x_o)$ such that $n(x_o)^{\perp}$ is obtained by rotating $n(x_o)$ 90 degrees counter-clockwise, and $D_\mu(x_o)$ is the jump of $\mu$ at $x_o$:

$$D_\mu(x_o) = \lim_{h \to +0} [\mu(x_o + hn(x_o)) - \mu(x_o - hn(x_o))].$$

Similarly to Equation (8), the behavior of the mollified local tomography function $\tilde{f}_{A\epsilon}^{(\Phi)}$ in a neighborhood of $\Gamma$ is given by the relationship:

$$\tilde{f}_{A\epsilon}^{(\Phi)}(x_o + \epsilon y) = \qquad \text{Eq. (17)}$$

$$-\frac{A(x_o, \mu, f) D_\mu(x_o)}{2\pi} \frac{1+O(\epsilon)}{\epsilon} \psi(y \cdot n_o) + \psi_\epsilon(y \cdot n_o) + O(\epsilon \ln \epsilon),$$

Thus, even in the case of nonsmooth attenuation, values of jumps of f can be found using the same algorithm as in the case of smooth attenuation.

If the attenuation coefficient $\mu(x)$ is not known, Equation (8) shows that values of jumps of f are not recovered. Comparing Equations (6) and (15), it is seen that jumps at f and $\mu$ will show up in the local tomography reconstruction in similar fashion: as sharp black-white transitions. Thus, if $\mu(x)$ is not known, the locations of jumps of f and $\mu$ are recovered using the following process:

(1) compute $\tilde{f}_{A\epsilon}^{(\Phi)}$ using Equation (7); and
(2) locate places where $\tilde{f}_{A\epsilon}^{(\Phi)}$ experiences sharp variations.

Figure 2:
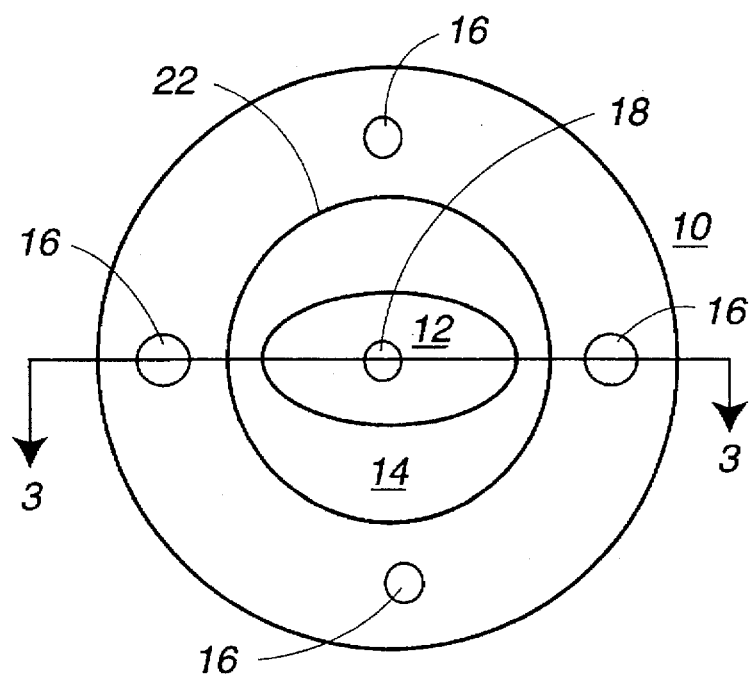
FIG. 2 is an exemplary phantom f to demonstrate the capabilities of the present invention.
Figure 3:
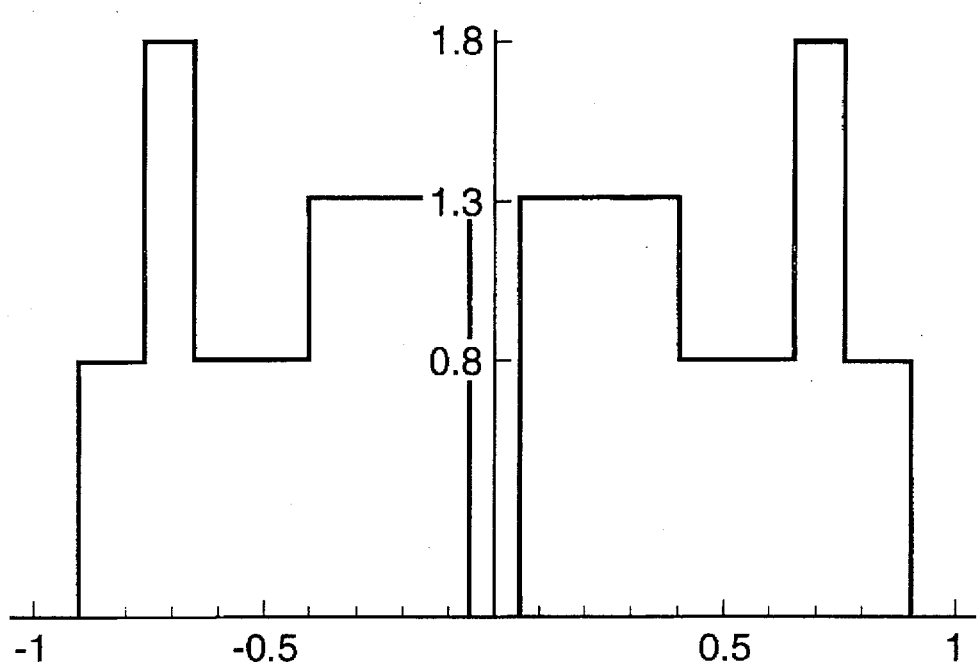
FIG. 3 is the horizontal cross-section of values through the phantom f shown in FIG. 2.

In FIG. 2, a phantom is shown for generating an illustrative attenuated Radon transform data. The densities are as follows—exterior 10: 0, ellipse 12: 1.3, area 14 outside the ellipse: 0.8, four small disks 16 off the center: 1.8, the small disk 18 at the center: 0. Physically, the phantom is described by the radius of the phantom: 0.9; half-axes of ellipse 12: 0.2 and 0.4; the radii of the four small disks 16: 0.05. Circle 22 outside the ellipse denotes discontinuity curve $\Gamma$ of $\mu$. The central horizontal cross-section of the density function f is shown in FIG. 3.

Figure 4:
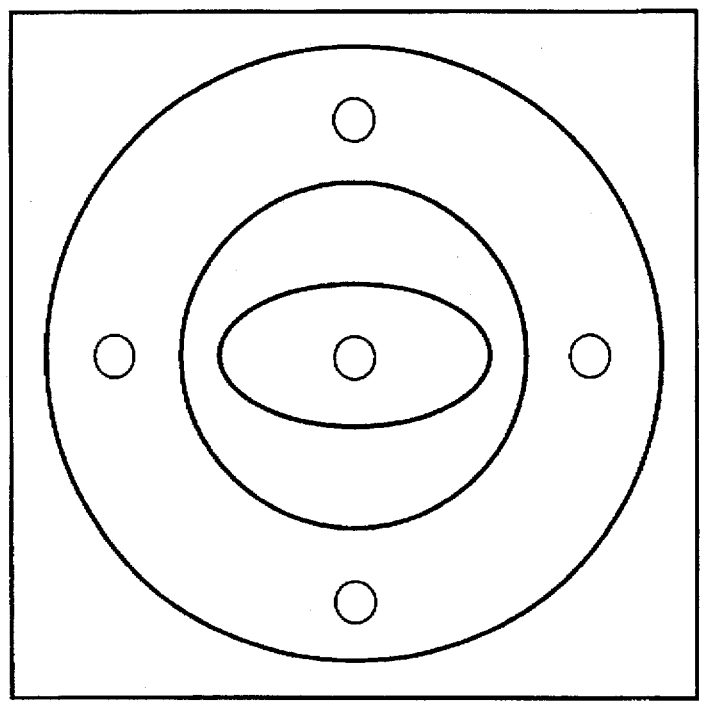
FIG. 4 is a density plot of the mollified local tomography function $f_A^{(\Phi)}$.
Figure 5:
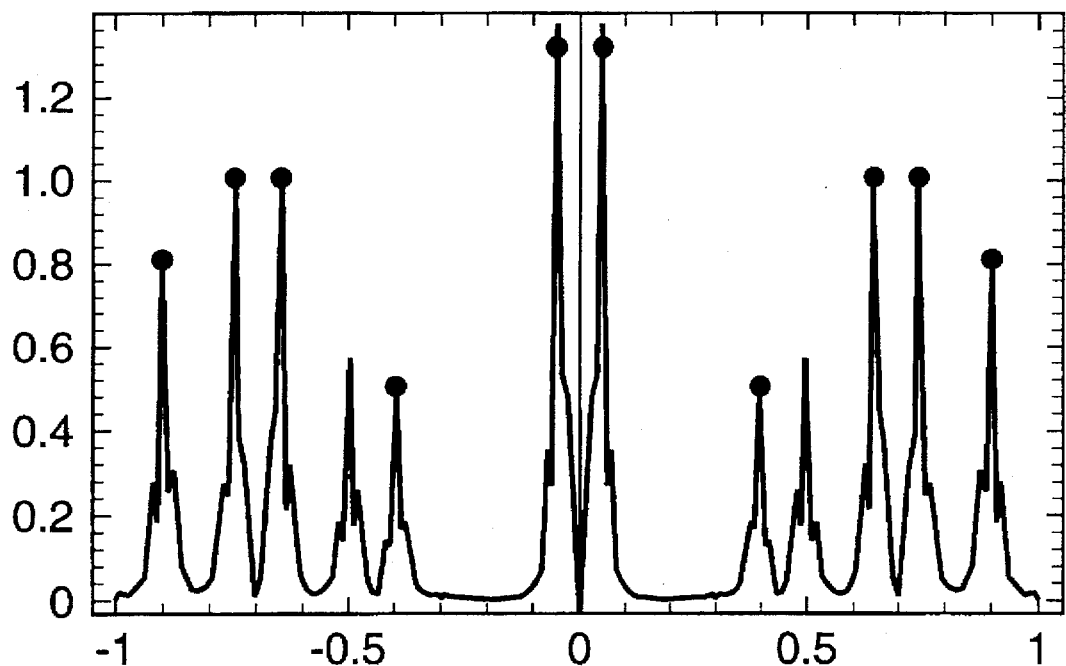
FIG. 5 is a horizontal cross-section through the density plot of $D_f(\chi)$ to graphically depict computed values of $D_f(\chi)$.

The density plot of mollified local tomography function $\tilde{f}_{A\epsilon}^{(\Phi)}$ is shown in FIG. 4. The attenuation coefficient in this example is given by $\mu(\chi)=0$ if $|\chi|>0.5$ and $\mu(\chi)=1$ if $|\chi| \leq 0.5$. The singular support of $\mu$ shows up in the figure in the same fashion as the singular support of f. A cross-section through the density plot of $D_f$ is shown in FIG. 5. The line with peaks is the graph of estimated $D_f(x)$, and the big dots represent positions and amplitudes of jumps of the original density function f (cf. FIG. 3). There is good agreement between the dots and maxima of the peaks. Two peaks without dots located next to them correspond to discontinuites in $\mu$.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for estimating by emission tomography the location S and value of a discontinuity between a first internal isotope density of an object and a second isotope density of a region within said object if the distribution of the attenuation coefficient μ inside the object is known, where the attenuation coefficient changes either smoothly or sharply inside said object, the method comprising the steps of:

detecting the intensity of radiation emitted along selected paths originating from said object containing at least a first region with said first internal isotope density and a second region with said second isotope density, wherein said isotope emits said radiation to form emission data;

inputting said emission data to a mollified local tomography function $f_{A\epsilon}^{(\Phi)}$ to define the location S of said discontinuity of said isotope density;

determining the asymptotic behavior of $f_{A\epsilon}^{(\Phi)}$ in said first and second regions in a neighborhood of S; and estimating said value of said discontinuity from said asymptotic behavior of $f_{A\epsilon}^{(\Phi)}$.

2. A method for estimating by emission tomography the location of a discontinuity between a first internal isotope density of an object and a second isotope density of a region within said object and the location of a discontinuity between a first internal value of attenuation coefficient μ and a second value of said attenuation coefficient within said object if the distribution of the attenuation coefficient is not known and where the attenuation coefficient may change abruptly inside said object, the method comprising the steps of:

detecting the intensity of radiation emitted along selected paths originating from said object containing at least a first region with said first internal isotope density and a second region with said second isotope density, wherein said isotope emits said radiation to form emission data;

inputting said data to a mollification of local tomographic function a $f_{A\epsilon}^{(\Phi)}$ for an attenuated Radon transform $f_A^{(\Phi)}(\chi)$ where, $$\tilde{f}_{A\epsilon}^{(\Phi)}(x) := (W_\epsilon * f_A^{(\Phi)})(x) = -\frac{1}{4\pi} \int_{S^1} \int_{\mathcal{R}} w_\epsilon''(\Theta \cdot x - p) \hat{f}^{(\Phi)}(\theta, p) dp d\theta,$$

and $W_\epsilon$ is a sequence of smooth mollifers for a distance $\epsilon$ near said discontinuity, $S^1$ is a unit circle, R is a unit sphere, $\omega_\epsilon$ is the classical Radon transform of $W_\epsilon$, and $\hat{f}^{(\Phi)}(\theta, p)$ is the measured line integral emission data, to determine a distribution of values for the mollified local tomographic function a $f_{A\epsilon}^{(\Phi)}$ locate said discontinuity between said first and second isotope densities and said discontinuity between said first and second attenuation coefficients.

* * * * *